(12) United States Patent
Chen

(10) Patent No.: US 6,334,974 B1
(45) Date of Patent: Jan. 1, 2002

(54) FRAGRANT PLASTIC CONTAINER FABRICATION METHOD

(76) Inventor: Ching-Tien Chen, No. 876-5, Ta-She, Hsin-Shih Hsiang, Tainan Hsien (TW)

( * ) Notice: Subject to any disclaimer, the term of this patent is extended or adjusted under 35 U.S.C. 154(b) by 0 days.

(21) Appl. No.: 09/439,122

(22) Filed: Nov. 15, 1999

(51) Int. Cl.$^7$ ............................................. B29C 45/00
(52) U.S. Cl. ..................... 264/328.18; 264/48; 523/102
(58) Field of Search ................. 428/905; 523/102; 264/328.18, 48

(56) References Cited

U.S. PATENT DOCUMENTS

| | | | | |
|---|---|---|---|---|
| 4,095,031 A | * | 6/1978 | Engle | 526/1 |
| 4,519,909 A | * | 5/1985 | Castro | 264/41 |
| 4,761,437 A | * | 8/1988 | Christie | 523/102 |
| 4,808,454 A | * | 2/1989 | Saitoh | 428/42 |
| 5,019,434 A | * | 5/1991 | Matsumoto | 428/35.7 |
| 5,316,712 A | * | 5/1994 | Ono et al. | 264/102 |

* cited by examiner

*Primary Examiner*—Allan R. Kuhns
(74) *Attorney, Agent, or Firm*—Dougherty & Troxell

(57) ABSTRACT

A fragrant plastic container fabrication method including the first step of preparing fragrant grains by dipping 30~35% by weight of homologous microporous plastics in 65~70% by weight of fragrant oil for about 24 hours, the second step of mixing 10% by weight of the fragrant grains thus obtained with 90% by weight of polyolefin to form an injection molding material, and the third step of injection-molding the injection molding material thus obtained into fragrant plastic containers through an injection molding machine.

1 Claim, 1 Drawing Sheet

FRAGRANT PLASTIC CONTAINER FABRICATION METHOD

BACKGROUND OF THE INVENTION

The present invention relates to a plastic container fabrication method, and more particularly to a method of fabricating fragrant plastic containers.

A variety of plastic materials have been developed and intensively used for making different containers by injection molding. Plastic materials for this purpose are inexpensive, however it is less valuable.

SUMMARY OF THE INVENTION

It is one object of the present invention to provide a fragrant plastic container fabrication method, which is simple. It is another object of the present invention to provide a fragrant plastic container fabrication method, which greatly increases the value of plastic containers. According to the present invention, microporous plastics is dipped in fragrant oil to form fragrant grains, the fragrant grains thus obtained are mixed with polyolefin, and the mixture thus obtained is then injection-molded into fragrant plastic containers through an injection-molding machine.

DETAILED DESCRIPTION OF THE PREFERRED EMBODIMENT

Figure 1:
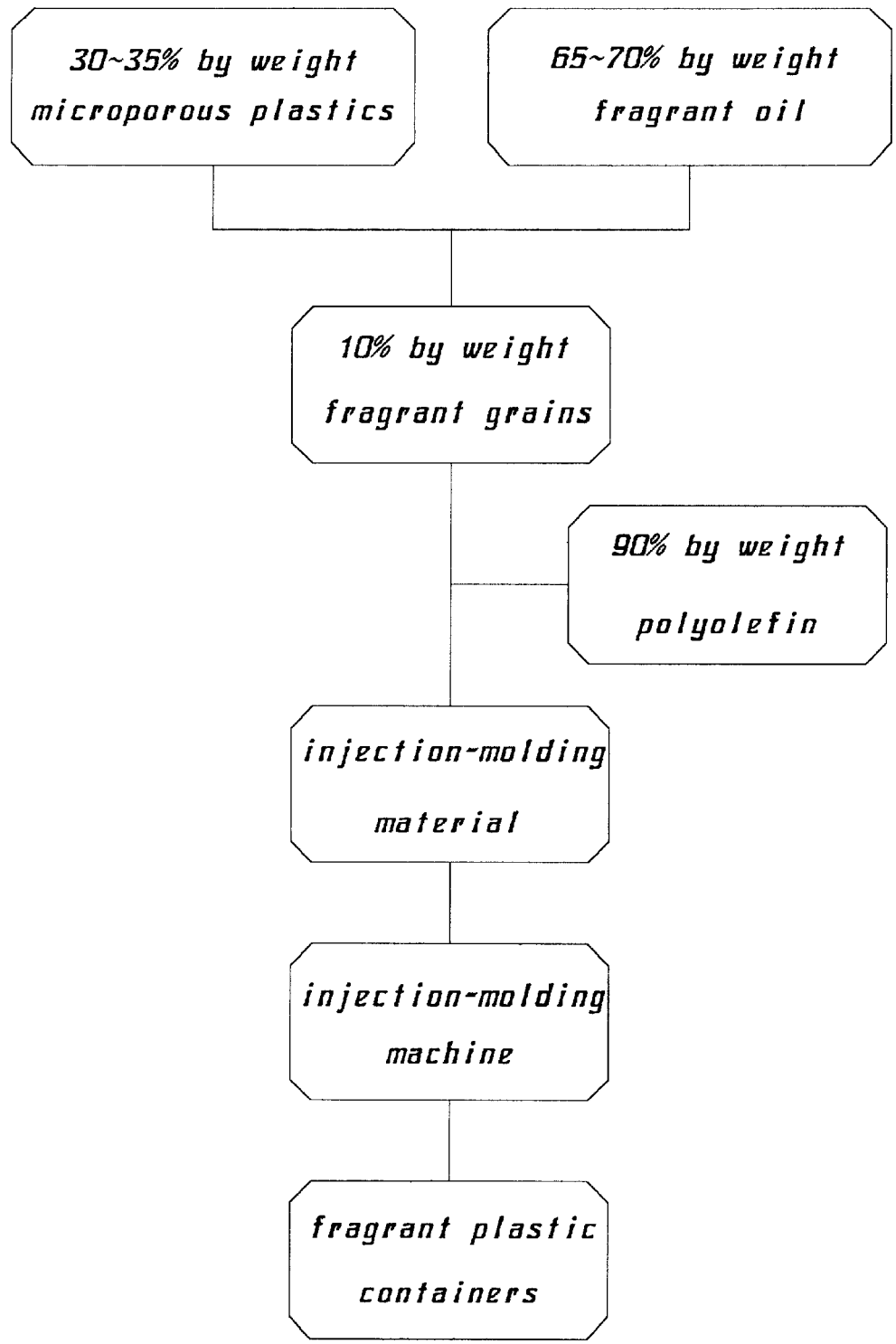
FIG. 1 is fragrant plastic container fabrication flow chart according to the present invention.

Referring to FIG. 1, fragrant grains are obtained by dipping 30~35% by weight of homologous microporous plastics in 65~70% by weight of fragrant oil of high boiling point and low viscosity for about 24 hours. The homologous microporous plastic material has open cells in it. The fragrant grains thus obtained are mixed with polyolefin at the ratio of 10% by weight of fragrant grains and 90% by weight of polyolefin, forming an injection molding material. The injection molding material is than injection-molded into desired shapes of fragrant plastic containers through an injection-molding machine. The good smell of a fragrant plastic container constructed according to the present invention lasts for about 150~200 days. However, a fragrant plastic container must not be matched with non-polarized material (such as acrylics, ABS). If matched with non-polarized material, the fragrant plastic container will be caused to dissolve.

What the invention claimed is:

1. A fragrant plastic container fabrication method comprising the steps of:

i) preparing fragrant grains by dipping 30~35% by weight of homologous microporous plastics in 65~70% by weight of fragrant oil for about 24 hours;

ii) preparing an injection molding material by mixing fragrant grains thus obtained from step i) with polyolefin at a ratio of 10% by weight of fragrant grains and 90% by weight of polyolefin, forming an injection molding material;

iii) injection-molding the injection molding material thus obtained into fragrant plastic containers through an injection-molding machine.

* * * * *